J. H. TANNER.
Combined Planter and Cultivator.

No. 222,748. Patented Dec. 16, 1879.

WITNESSES:
C. Neveux
C. Sedgwick

INVENTOR:
J. H. Tanner
BY
Munn & Co.
ATTORNEYS.

UNITED STATES PATENT OFFICE.

JAMES H. TANNER, OF WACO, TEXAS.

IMPROVEMENT IN COMBINED PLANTER AND CULTIVATOR.

Specification forming part of Letters Patent No. 222,748, dated December 16, 1879; application filed September 24, 1879.

*To all whom it may concern:*

Be it known that I, JAMES H. TANNER, of Waco, in the county of McLennan and State of Texas, have invented a new and Improved Combined Planter and Cultivator, of which the following is a specification.

Figure 1:
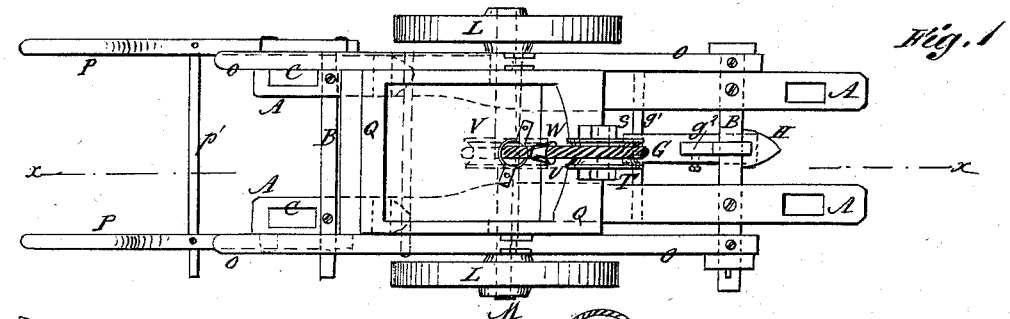
Figure 2:
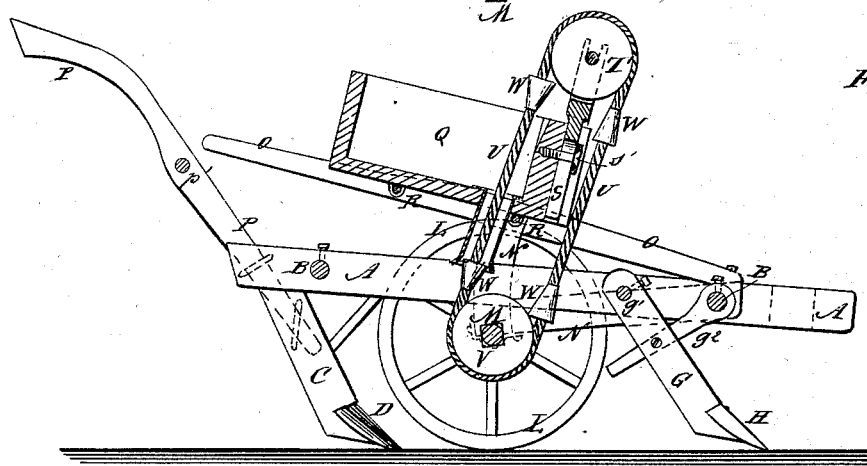
Figure 3:
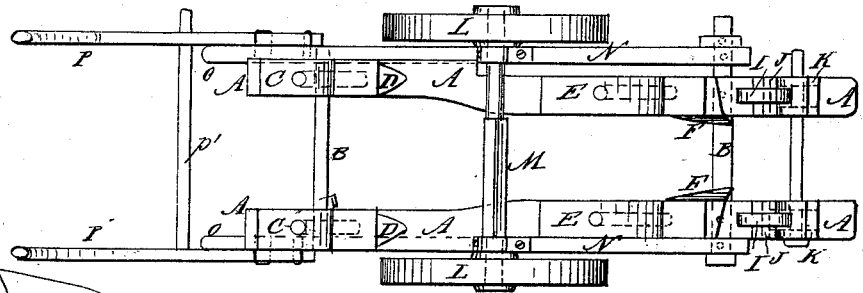
Figure 4:
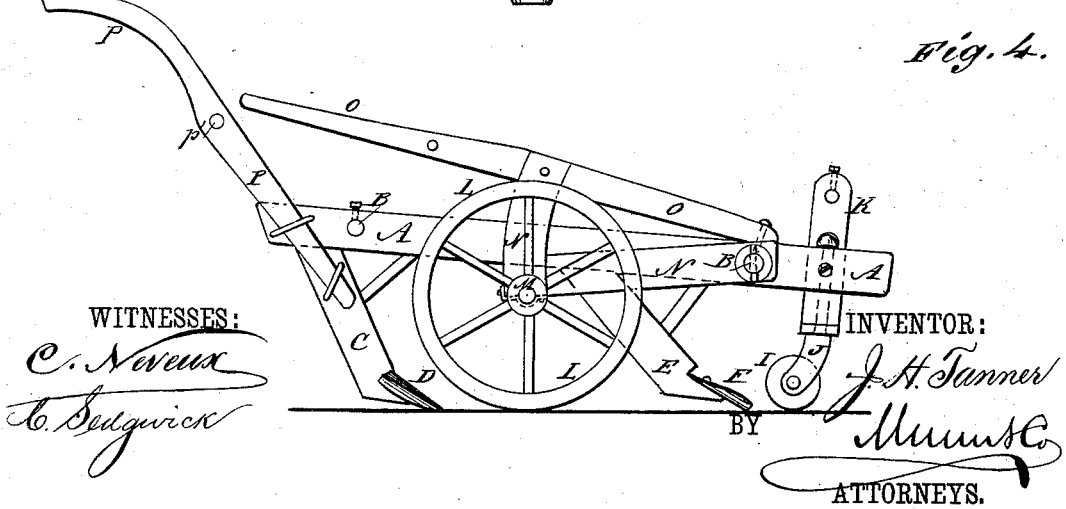

Figure 1 is a plan of my improved machine arranged for use as a planter. Fig. 2 is a longitudinal sectional elevation of the same taken through the line $x\ x$, Fig. 1. Fig. 3 is a bottom view of the same arranged for use as a cultivator. Fig. 4 is a side elevation of the same.

Similar letters of reference indicate corresponding parts.

The object of this invention is to furnish a combined planter and cultivator which shall be so constructed that the seed-dropping appliances can be readily detached and the machine adjusted for use as a cultivator.

A are two beams, which are connected together near their ends by rods or bars B. The rods or bars B are secured at one end to one of the beams A, and their other ends pass through the other beam, A, which is secured to them adjustably by set-screws or other suitable means, so that the said beams A may be adjusted at any desired distance apart. To the rear ends of the beams A are attached the upper ends of the standards C, to the lower ends of which are attached shovel-plows D, or other kinds of plows, as the character of the work to be done may require.

The plows D serve as coverers when the machine is used as a planter, and as dirters when the machine is used as a cultivator. To the middle parts of the beam A are attached the upper ends of the standards E, to the lower ends of which are attached the scrapers F for barring off the plants when the machine is used as a cultivator. The standards E are detached when the machine is used as a planter.

G is a standard, through a hole in the upper end of which is passed a rod or bolt, $g'$, which also passes through the beams A. The standard G is secured in place upon the said rod or bolt $g'$ adjustably by a set-screw or other suitable means, so that the said standard G may be adjusted midway between the beams A at whatever distance apart the said beams may be placed. To the lower end of the standard G is attached a plow, H, to open a furrow to receive the seed. The standard G is detached when the machine is used as a cultivator. The draft-strain upon the standard G is sustained by a brace-rod, $g^2$, the upper end of which has a hole formed through it to receive the forward rod, B, and is secured in place adjustably upon the said rod by a set-screw. The lower end of the brace-rod $g^2$ passes through the standard G, and is secured in place by a set-screw, so that the pitch of the said standard G may be regulated as desired. The forward end of the machine is supported by the caster-wheels I, the standards J of which are swiveled to the lower ends of the uprights K.

The uprights K pass up through slots in the forward ends of the beams A, and are secured in place adjustably by set-screws, so that the said upright K may be adjusted to support the forward end of the machine at any desired distance from the ground.

The caster-wheels I J K are detached when the machine is to be used as a planter. The rear part of the machine is supported by the wheels L, which are rigidly attached to the ends of the axle M. The axle M revolves in brackets N, attached to the levers O. The forward ends of the levers O are pivoted to the projecting ends of the forward rod or bar B, where they are kept in place by pins and washers, screw-nuts, or other suitable means.

The rear ends of the levers O extend back into such a position that they may be conveniently reached and operated by the driver to raise and lower the forward end of the machine as may be required.

The levers O and brackets N may be held in place when adjusted by pawls and ratchets, set-screws, or other suitable means.

To the rear parts of the beams A are attached the lower ends of the handles P, the upper parts of the said handles being connected by a round, $p'$. One end of the round $p'$ is attached to one of the handles P, and its other end passes through a hole in the other handle P, and is secured in place by a set-screw, so that the handles P may be adjusted to correspond with the adjustment of the beams A. The seed-hopper Q is secured to and between the levers O by rods R, which rods pass through the said levers O and through keepers attached to the bottom of the said hopper Q.

In a groove in the forward end of the hopper Q is placed the lower part of a standard, S, which is slotted to receive the screw $s'$, for clamping the said standard in place when adjusted. The upper end of the standard S is slotted to receive the pulley T, which is pivoted to the said standard, and has its face grooved to receive the endless band U. The band U passes down in front of the hopper Q, passes around the pulley V attached to the axle M, and passes up through an aperture in the forward part of the bottom of the said hopper Q.

To the band U are attached cups W, which take the seed from the hopper Q, carry it over the pulley T, and drop it to the ground.

A spout may be used to receive the seed and conduct it to the ground, which spout is not shown the drawings.

The cups W are made of such a size as to contain the exact amount of seed required to be dropped at a time, and such a number of the said cups are used as will drop the hills at the required distance apart.

The tension of the endless band U is regulated by adjusting the standard S.

When the machine is to be used as a planter the scrapers E F and the caster-wheels I J K should be removed.

When the machine is to be used as a cultivator the opening-plow G H and the hopper Q and its attachments should be removed.

The machine may be provided with a driver's seat, if desired, to which a lever may be attached, to adjust the machine in turning when the machine is used either as a planter or cultivator, the said lever to be fastened to the front part of the machine resting on an upright at the rear end of said machine, with caster or other wheels attached to the lower end of said upright.

Having thus described my invention, what I claim as new, and desire to secure by Letters Patent, is—

1. The combination of wheels L L, axle M, journaled in brackets of lever O, and the frame A B, having handles at the rear end, and provided with adjustable caster-wheels in front, as shown and described.

2. The combination, with levers O and axle M, of the rods R, grooved hopper Q, slotted adjustable standard S, pulleys T V, and endless band U, as shown and described.

JAMES HENRY TANNER.

Witnesses:
  A. PAYNE,
  F. M. MAKEIG.